US007551042B1

(12) United States Patent
Johnson

(10) Patent No.: US 7,551,042 B1

(45) Date of Patent: Jun. 23, 2009

(54) MICROWAVE PULSE COMPRESSOR USING SWITCHED OVERSIZED WAVEGUIDE RESONATOR

(76) Inventor: Ray M. Johnson, 22661 Highway 62, Shady Cove, OR (US) 97539

( * ) Notice: Subject to any disclaimer, the term of this patent is extended or adjusted under 35 U.S.C. 154(b) by 56 days.

(21) Appl. No.: 11/810,459

(22) Filed: Jun. 5, 2007

Related U.S. Application Data

(60) Provisional application No. 60/812,417, filed on Jun. 9, 2006.

(51) Int. Cl.

| | |
|---|---|
| ***H04B 3/04*** | (2006.01) |
| ***H01P 5/12*** | (2006.01) |
| ***H01P 9/00*** | (2006.01) |
| ***H01P 1/20*** | (2006.01) |
| ***H01P 3/00*** | (2006.01) |
| ***H01P 1/00*** | (2006.01) |

(52) U.S. Cl. ......................... 333/20; 333/227; 333/122; 333/135; 333/137; 333/157; 333/208; 333/81 B; 333/239; 333/248

(58) Field of Classification Search .................... 333/20
See application file for complete search history.

(56) References Cited

U.S. PATENT DOCUMENTS 3,574,438 A * 4/1971 Carson ..................... 333/81 B
3,588,760 A * 6/1971 Bondon ...................... 333/241
4,516,088 A * 5/1985 Johnson et al. ............ 333/22 F
4,533,884 A * 8/1985 Hudspeth et al. .............. 333/26
4,641,140 A * 2/1987 Heckaman et al. .......... 342/371
4,758,795 A * 7/1988 Ripin et al. .................... 330/4
5,066,928 A 11/1991 Ikezi et al.
5,148,129 A 9/1992 Bolton
5,283,538 A * 2/1994 Geisler et al. ............. 333/24 R
5,796,314 A 8/1998 Tantawi et al.
6,081,241 A * 6/2000 Josefsson et al. ............ 343/771

(Continued)

OTHER PUBLICATIONS

R.A. Alvarez, D.P. Byrne, and R.M. Johnson, "Prepulse Suppression in Microwave Pulse-Compression Cavities," Rev. Sci. Instrum., vol. 57, No. 10, Oct. 1986, pp. 2475-2480.

(Continued)

*Primary Examiner*—Rexford N Barnie
*Assistant Examiner*—Matthew C Tabler
(74) *Attorney, Agent, or Firm*—Donald L. Beeson; Beeson Skinner Beverly, LLP

(57) ABSTRACT

A microwave pulse compressor has an elongated, cross-sectionally oversized waveguide resonator for decreasing the attenuation of the resonator, thereby increasing the resonator's $Q_O$ The increased Q of the resonator guide results in more stored energy and greater output pulse power. The pulse compressor is constructed to suppress high order modes that can be generated in oversized waveguides. The higher order modes are suppressed by any means, including, separately or in combination, the input coupling design, choice of the resonator length, and the design of the output coupling structures. In one alternative aspect of the invention, the switch at the switch-out end of the waveguide resonator is a plasma switch, employing at least one dielectric window positioned in the resonator guide to have minimum effect on the resonator Q. The dielectric window contains a relatively large volume of a switch gas at low pressure within a switching section of the resonator guide at the guide's switch-out end. A static magnetic field can be provided for confining the plasma produced upon triggering to the region which produces the most effective switching action.

27 Claims, 6 Drawing Sheets

U.S. PATENT DOCUMENTS 6,100,703 A * 8/2000 Davidov et al. ............. 324/631
6,208,285 B1 3/2001 Burkhardt
6,414,323 B1 7/2002 Abe et al.
6,590,477 B1 * 7/2003 Elco ........................... 333/239
7,239,219 B2 * 7/2007 Brown et al. ................ 333/156
2006/0087381 A1 * 4/2006 Johnson .................... 333/22 R

OTHER PUBLICATIONS

R.A. Alvarez, "Some Properties of Microwave Resonant Cavities Relevant to Pulse-Compression Power Amplification," The Review of Scientific Instruments, Apr. 1986 (preprint).

* cited by examiner

MICROWAVE PULSE COMPRESSOR USING SWITCHED OVERSIZED WAVEGUIDE RESONATOR

CROSS-REFERENCE TO RELATED APPLICATIONS

This application claims the benefit of U.S. Provisional Application No. 60/812,417 filed Jun. 9, 2006.

BACKGROUND OF THE INVENTION

The present invention generally relates to microwave pulse compressors, and more particularly to microwave pulse compressors capable of producing short output pulses (typically nanosecond pulses) from relatively long (typically microsecond) pulse inputs.

Short pulse switched microwave compressors have been designed and fabricated using a fundamental mode rectangular copper waveguide resonator, that is, a length of copper waveguide having a cross-sectional size large enough to propagate and store energy in the fundamental mode, but small enough exclude higher order modes. This type of pulse compressor stores microwave energy fed into the resonator from a pulse source, typically a magnetron or klystron, over a pulse length of a few microseconds. After a fill time, this stored energy is abruptly "switched-out" as a shorter nanosecond pulse through an output coupled to the waveguide resonator. The resonator guide is long compared to the broad and narrow wall dimensions. An output coupling scheme is devised so that, in theory, limited or zero power is coupled to an output port during the fill time, and then is abruptly and strongly coupled to this port at switch-out.

To illustrate the theory of operation of short pulse switched microwave compressors, consider a rectangular fundamental mode waveguide resonator as having shorting plates at each end of the length of the resonator guide. One of these shorting plates has a small input hole or aperture for coupling a source of input pulse power to the resonator guide. This is the input end of the resonator guide. Both plates act to reflect the traveling wave in the resonator guide resulting from the pulse power introduced at the input end. Introduction of input pulse power at the input end results in a build-up of stored energy in the resonator, which occurs during a "fill time." (The length of the resonator waveguide must be a multiple of half guide wavelengths to resonate and to allow stored energy to build during the fill time.) Assuming an output waveguide is coupled to the end of the resonator guide opposite the input end, by instantaneously removing the shorting plate (switch-out) at the output end, the energy stored in the resonator guide is released as a traveling wave in the output waveguide. Power traveling toward the output guide at switch-out would first flow into the output waveguide, followed by power that had been reflected back toward the input end at switch-out. This reflected power would travel back toward the shorting plate at the guide's input end and then be reflected back to the output waveguide. The time it takes for this to occur (in nanoseconds) defines output pulse length. The output pulse power is the power level of the traveling waves within the resonator at switch-out. Because the output pulse times are on the order of nanoseconds, the removal of the shorting plate as described above would have to be accomplished in a fraction of a nanosecond. This is not possible, so other switch-out schemes are required.

Instantaneous switch-out has been achieved using a gas plasma switch in front of a shorting end wall or plate at the end of a rectangular resonator guide which is opposite the guide's input end. Using such instantaneous switch-out schemes, power is coupled out through the short sidewall of the resonator guide at a position of maximum or near maximum longitudinal magnetic field when the plasma switch is fired.

A drawback of the above-described short pulse microwave compressors is that, at room temperatures, the fundamental mode waveguide structures used are limited to modest pulse power gains. This is principally due to low unloaded quality factors. For example, a $Q_O$ of about 10,000 to 12,000 can be expected at 3.0 GHz frequency using a copper waveguide resonator fabricated of a section of a CPR284 waveguide. The power level of the output pulse is constrained by the Q of the resonator guide structure, the power and pulse length (i.e., time) of the drive source, and the input coupling coefficient.

Therefore, a long-felt unresolved need exists for a short pulse microwave compressor that, for a given input pulse power level, pulse length, and input coupling coefficient, is capable of producing short output pulses at higher power levels than can be achieved by conventional short pulse switched compressors.

SUMMARY OF THE INVENTION

The present invention is a switched microwave pulse compressor comprised of an elongated and cross-sectionally oversized waveguide resonator (the waveguide resonator is sometimes referred to herein as "resonator" or "resonator guide") having waveguide sidewalls and opposed shorting end walls wherein the distance between said shorting end walls defines the length of the resonator. The waveguide resonator further includes at least one pulse power input and at least one switch-out end. Means are provided for coupling microwave pulse power into the waveguide resonator at its pulse power input. This coupling means could include, for example, a coupling aperture in the shorting wall of the resonator guide opposite the resonator's at least one switch-out end. A fast action shorting switch is provided at the switch-out end in front of the shorting end wall. Activation of this switch ("switch-out") will cause an axial shift in the maximum electric and magnetic fields of the fundamental mode within the oversized resonator guide. At least one, and preferably two, symmetrically placed output microwave transmission lines, most suitably waveguide transmission lines in most applications, are coupled to sidewalls of the waveguide resonator so that they can couple to the longitudinal magnetic field of the waveguide's fundamental mode at switch-out. The output transmission line or lines are located along the resonator guide's sidewall in a region of substantially minimum longitudinal magnetic field strength for the fundamental mode when said shorting switch is not activated, and in a region of substantially maximum fundamental mode longitudinal magnetic field strength when the shorting switch is activated, such that activation of the shorting switch causes power to couple out of the guide.

As mentioned, the cross-sectional dimensions of the waveguide resonator of the invention are oversized as compared to conventional switched microwave compressors, and more particularly are greater than those required for fundamental mode propagation only. By increasing the cross-sectional dimensions required for single mode propagation, the attenuation of the resonator guide decreases and the resultant $Q_O$ increases, resulting in more stored energy and greater output pulse power.

Because oversized waveguides can propagate higher order modes, these higher order modes are preferably suppressed. In accordance with one aspect of the invention, the higher order modes can be suppressed by any means, including, separately or in combination, the input coupling design, choice of the resonator length, and the design of the output coupling structures.

Oversized waveguide resonators for increasing the Q of the pulse compressor of the invention include square guides and oversized rectangular and cylindrical (circular) waveguides. (Other shapes are possible, such as an oval-shaped guide.) It is believed, for example, that a square waveguide structure operating in the $TE_{10}$ mode can improve the Q factor by a nominal 40% over a rectangular guide. (This structure propagates additional $TE_{01}$, $TE_{11}$ and $TM_{11}$ modes that must be suppressed.)

A cylindrical guide, however, is the preferred shape for the resonator. In pulse compressors handling high peak power, it is necessary to use a gas medium, such as sulphur hexafluoride ($SF_6$), in the resonator guide to prevent hazardous radiation from being produced by electron emissions from the guide walls. The electron emissions are caused by the electric fields, which are normal to the conductive guide walls. The fundamental $TE_{11}$ cylindrical waveguide mode has an advantage over the fundamental modes for rectangular and square waveguide geometries in that it has lower field strengths at the guide walls, thus reducing the gas pressure requirements to prevent electron emission. Lower field strengths at the guide walls also increase the unloaded quality factor of the resonator. (For cylindrical waveguides, the maximum E-field values are actually reduced by oversizing.) The $Q_O$ of an oversized resonator can exceed by a factor of five the $Q_O$ of a rectangular waveguide for cylindrical sizes below the cutoff frequency of the $TE_{01}$ and $TM_{11}$ modes. Still further, with field levels that may require pressures of a range of 2 to 7 atmospheres in $SF_6$, a cylindrical structure has a pressure vessel advantage in terms of deformation, required wall thickness, and weight.

DETAILED DESCRIPTION OF THE ILLUSTRATED EMBODIMENTS

Figure 1:
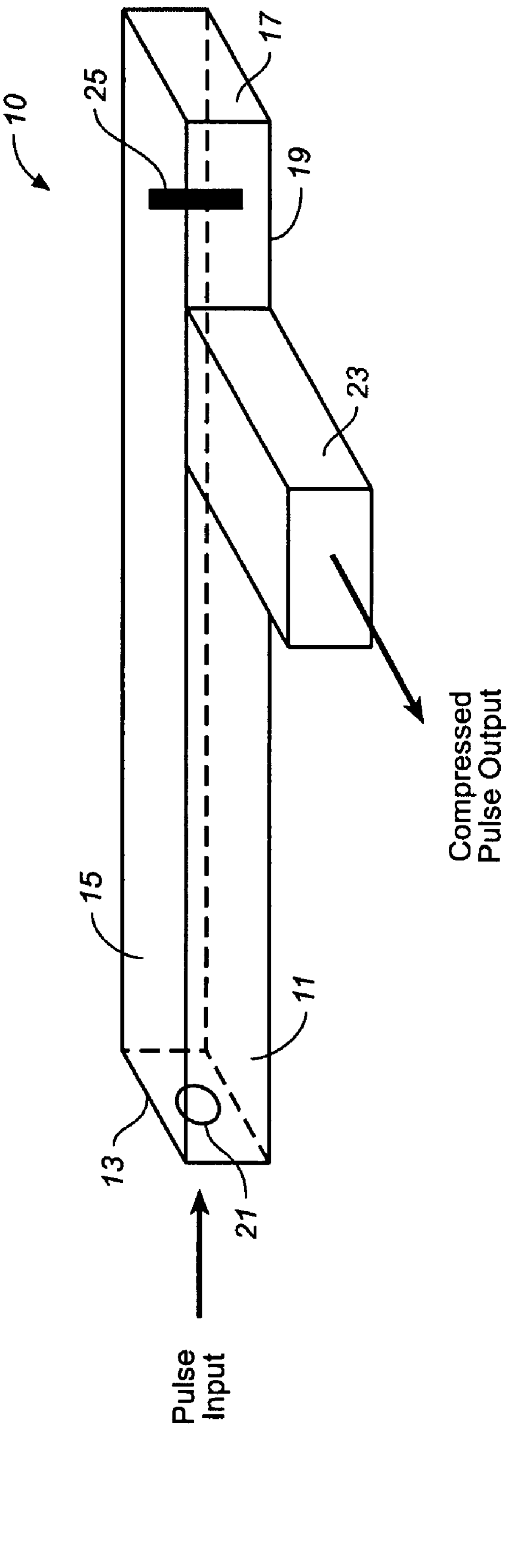
FIG. 1 (PRIOR ART)
FIG. 1 is a graphical depiction of a known microwave compressor.

Referring now to the drawings, FIG. 1 illustrates the concept of a microwave pulse compressor known in the art, wherein a waveguide resonator 10 sized to propagate only the fundamental mode is formed by a section of rectangular waveguide 11, a shorting end wall 13 at one end of the waveguide section (input end 15), and a shorting end wall 17 at the other end (switch-out end 19). The shorting end wall at the input end 15 has an aperture 21 for coupling pulse power into the resonator guide. Pulse power is coupled out of the resonator guide through output waveguide 23, which is coupled to the sidewall of the resonator's rectangular waveguide 11. This output guide couples stored energy out of the resonator guide upon triggering a fast action switch, graphically represented by element 25, which is typically a plasma switch comprised of a dielectric tube positioned on the centerline of the guide. This tube of the plasma switch runs between the broadwalls of the resonator guide parallel to the electric field, and contains a separate gas under pressure to maintain its dielectric strength until the trigger, which is usually in the form of a fast spark gap or laser pulse, is applied. The trigger initiates a breakdown of the contained gas to produce a conductive plasma, creating a new shorting position in front of shorting end wall 17. This new shorting position acts to abruptly shift the narrow wall magnetic field within rectangular waveguide section 11 from a zero to a maximum level at the position of the output waveguide 23, such that, at switch-out, microwave energy stored in the resonator couples to the output guide. Switch-out occurs after a fill time during which microwave energy from relatively long input pulses (on the order of microseconds) is coupled into the resonator guide. Upon switch-out, the microwave energy couples out of the resonator guide in a relatively short period of time (on the order of nanoseconds), as determined by the length of the resonator guide. Thus, the length of the resonator guide will determine output pulse width. (The recovery rate of the plasma switch after switch-out will limit the pulse rate at which this type of pulse compressor can operate.)

FIGS. 2A-2D illustrate a microwave pulse compressor in accordance with the invention, wherein pulse compressor 27 is comprised of a waveguide resonator formed by a square waveguide section 29 and shorting end walls 31, 33. The resonator guide has an input end 35 (also referred to as a "feed end") and switch-out end 37. Pulse energy is suitably fed in at the input end of the resonator through a rectangular-to-square waveguide taper 39 connected to the conducting end wall of the resonator, which is provided with an aperture or apertures, for example, with dual coupling apertures 41, formed and located on the end wall for coupling pulse power to the fundamental $TE_{10}$ mode in the resonator guide. It shall be understood that other feed arrangements are possible, including a step transition. Symmetrical output transmission lines in the form of output waveguides 43, 45 are coupled to opposed sidewalls 47, 49 of the square waveguide section near the resonator switch-out end 37. A fast acting shorting switch in the form of a plasma switch 51 of a type well known in the art is provided at the resonator's switch-out end in front of shorting end wall 33. The switch is located on the waveguide axis (A), preferably one-quarter or three-quarters of a wavelength from the shorting end wall 33.

Because the resonator guide would normally be pressurized with a gas, such as $SF_6$, suitably located dielectric waveguide windows (not shown) would be provided at the input feed waveguide (not shown) and at the output waveguides (also not shown) of the resonator guide.

The resonator guide's output waveguides 43, 45 are suitably rectangular fundamental mode guides that are match-coupled to the resonator guide 29 at switch-out conditions. Designing apertures in the sidewalls of the resonator guide for match-coupling for a selected output waveguide can be achieved by trial- and error measurements. For example, this can be accomplished by opening the input end of the resonator guide including removing the aperture, shorting the switch-out end of the resonator guide at the plasma switch location with a metal rod or other shorting device in order to simulate an activated plasma switch, and then measuring the match (VSWR) at the opened input end. As discussed above, the output guides are located along the resonator guide, so that, at switch-out, the longitudinal magnetic field strength in the resonator guide for the fundamental mode at the guide sidewalls 47, 49 shifts from zero (or near zero) to a maximum (or near maximum) at the position of the output guides.

The square waveguide section 29 of the resonator guide is oversized in relation to a rectangular waveguide having the same broadwall dimension, and will have a significantly larger $Q_O$ than for a rectangular guide, and thus will have the ability to store more pulse energy. In an S-band pulse compressor, the width of each side of square waveguide section 29 can suitably correspond to the broadwall of an R284 waveguide. Like the rectangular guide, the square guide will propagate the fundamental $TE_{10}$ mode; however, unlike the rectangular guide, the oversized square guide is also capable of propagating the orthogonal $TE_{01}$ mode as well as the higher order $TE_{11}$ and $TM_{11}$ modes. The invention contemplates the suppression of these higher order modes by any means or combination of means, including the design of the input and output coupling, providing for symmetrical outputs, and/or waveguide bifurcation.

Figures 2A, 2B, 2C, 2D:
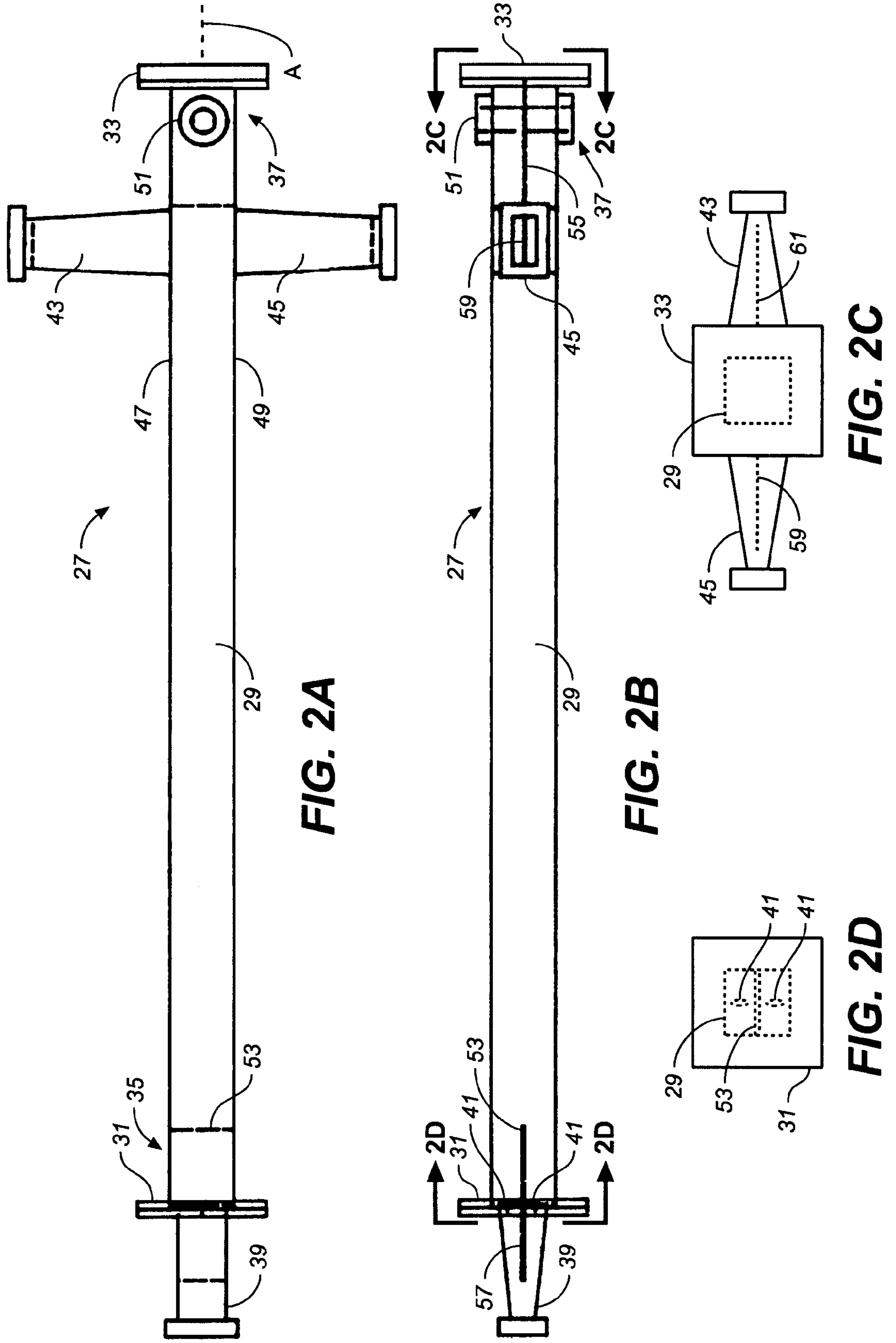
FIG. 2A is a top plane view of a microwave pulse compressor in accordance with the invention having an oversized square waveguide resonator.
FIG. 2B is a side elevational view thereof.
FIG. 2C is an elevational view of the switch-out end thereof.
FIG. 2D is an elevational view of the input end thereof.

In the embodiment shown in FIGS. 2A and 2B, suppression of the higher order modes includes bifurcating the square waveguide section 29 of the resonator at the input and switch-out ends of the resonator guide by means of bifurcating conductor plates 53, 55, each of which divides the square guide into smaller height rectangular guide sections over a portion of the resonator waveguide. At the switch-out end, the bifurcation plate 55 preferably has a length equal to one-half the guide wavelength, and will have a hole for accommodating plasma switch 51. The length of the bifurcation plate at the input or feed end should be long enough to separate the frequencies of the higher order modes from the fundamental mode frequency sufficiently to prevent higher order modes from being excited by the pulse energy fed into the resonator guide at the fundamental mode frequency; however, preferably the length of this plate is otherwise as short as possible in order to minimize the effect of the plate on the resonator Q. Also, while resonator guide shown in FIGS. 2A and 2B is shown as having mode suppressing bifurcation plates at both the feed and switch-out ends of the resonator guide, it shall be understood that waveguide bifurcation for higher order mode suppression can be provided at one end of the guide only. In this case, guide bifurcation is preferably be provided at the feed end of the waveguide resonator. Bifurcation at the feed end only would have a couple of advantages. It would avoid the difficulty of designing a bifurcation plate that won't have some effect on the operation of the plasma switch 51. It would also reduce the degradation in the Q of the resonator guide caused by the bifurcation plates.

It is noted that additional bifurcation for higher order mode suppression can be provided in the input taper 39 and output waveguides 43, 45. In the case of the input taper bifurcation is achieved by bifurcation plate 57; in the case of the output waveguides it is achieved by conductor plates 59, 61.

Symmetry also acts to prevent excitation of unwanted modes. Thus, the resonator itself is preferably linear, with a mirror symmetry being maintained about the mid-plane running through the guide axis in the E-field direction. The symmetric output waveguides 43, 45, with symmetric coupling to the resonator guide 29, contribute to this symmetry. Unwanted mode suppression can further be achieved through the selection of the length of the resonator waveguide section 29 as hereinafter described. As mentioned, the above-described mode suppression techniques can be use separately or in combination.

Figures 3A, 3B, 3C:
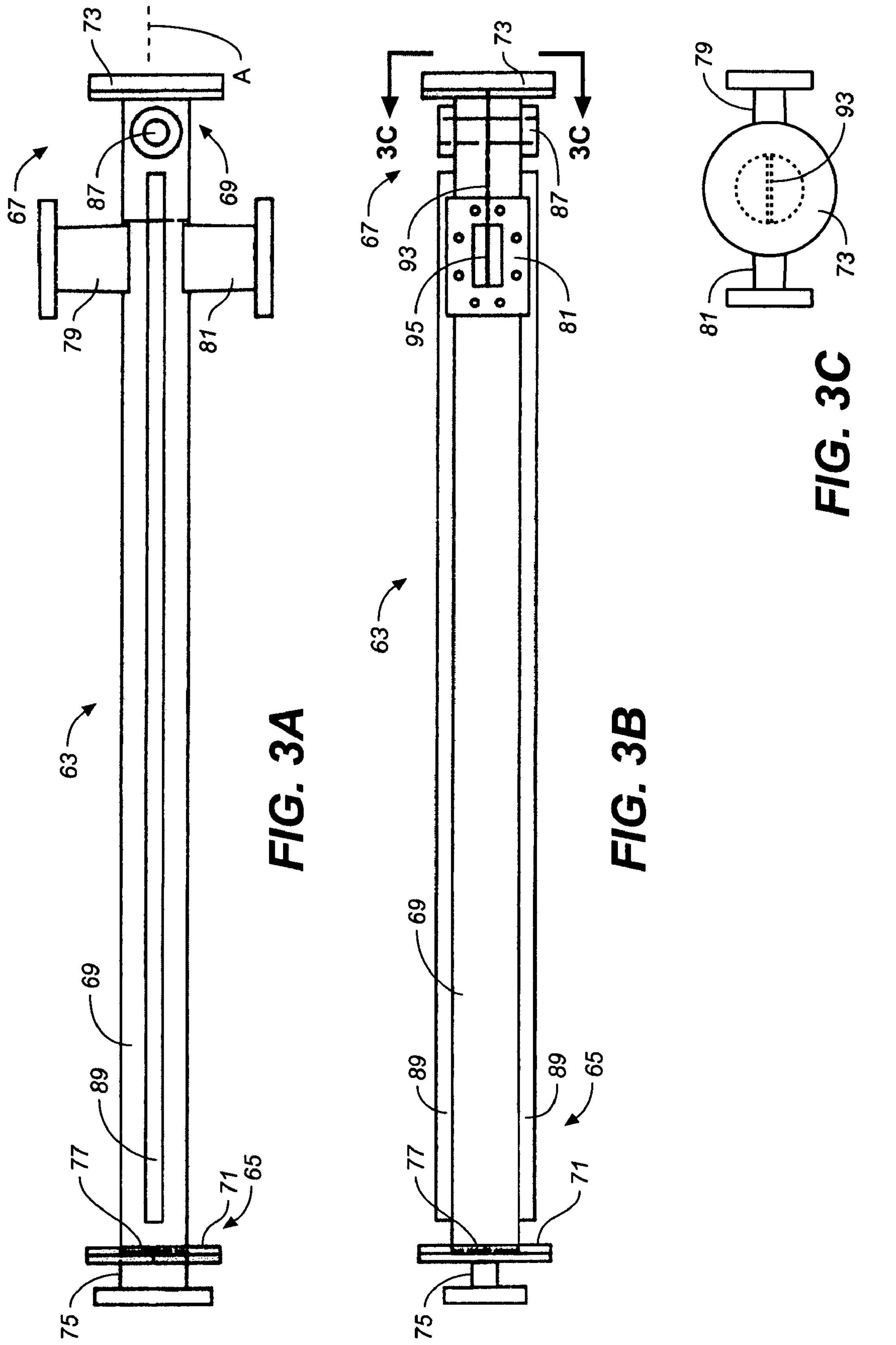
FIG. 3A is a top plane view of a microwave pulse compressor in accordance with the invention having an oversized cylindrical waveguide resonator.
FIG. 3B is a side elevational view thereof.
FIG. 3C is an end elevational view thereof.

FIGS. 3A-3C illustrate a cylindrical pulse compressor, wherein the pulse compressor 63 is comprised of a waveguide resonator having an input end 65 and switch-out end 67 formed by a cylindrical waveguide section 69 and shorting end walls 71, 73. Pulse energy is suitably fed straight into the input end of the resonator through a rectangular waveguide input 75 connected to apertured conducting end wall 71. An aperture 77 is formed and located on the end wall 71 for coupling pulse power to the fundamental mode of the cylindrical resonator guide, which is the $TE_{11}$ mode. It shall be understood that other feed arrangements are possible, including the use of a tapered waveguide feed. Symmetrical output waveguides 79, 81 are coupled to opposed sidewalls 83, 85 of the cylindrical waveguide section near the resonator switch-out end 67. (The heights of the output waveguides will be about one half the diameter of the resonator guide.) A plasma switch 87 of a type well known in the art is provided at the resonator's switch-out end in front of shorting end wall 73. The switch is located on the waveguide axis (A), preferably one-quarter wavelength from the shorting end wall.

Because in high-power applications the resonator of the pulse compressor will heat up, cooling tubes 89 as shown in FIGS. 3A-3C can be provided on the sidewalls of the resonator-guide. A cooling fluid, typically water, is circulated through these tubes for stabilizing the temperature, and hence the resonant frequency of the resonator.

As is the case with the square resonator illustrated in FIGS. 2A-2C, suppression of the higher order modes in the cylindrical resonator can include using waveguide bifurcation. As shown in FIGS. 3B and 3C, guide bifurcation in this case is provided at the switch-out end 67 by bifurcation plate 93 and by bifurcating the output guides 79, 81, as indicated by bifurcation plate 95. Higher mode suppression can also be achieved by sizing the length of the waveguide to suppress unwanted modes, and/or maintaining symmetry about the mid-plane running through the guide axis in the E-field direction, which includes providing a straight waveguide section with symmetrically opposed waveguide outputs, and/or by proper design of the coupling aperture 77 in end wall 71 at the resonator input.

The following is one example of the calculated performance characteristics for a cylindrical pulse compressor having an operating frequency of 5.7 GHz and a waveguide resonator having an inside diameter of 5 cm and a length of 95 cm. In such a waveguide, only the $TM_{01}$ and the two orthogonal $TE_{11}$ cylindrical modes can propagate. A power gain of 70 and an efficiency of 35% is possible for a mode's peak power input. For room temperature copper at a frequency of 5.7 GHz, a theoretical unloaded $Q_O$ of $3.53\times10^4$ has been calculated. Using a magnetron pulse power of 0.25 MW and a pulse length of 2.5 microseconds, and assuming the actual pulse compressor achieves approximately 94% of the above-calculated unloaded Q, or $3.3\times10^4$, the resonator can store 0.2 Joules of energy at a pulse filling time of 2.3 μsec (assuming a coupling coefficient, $\beta=1.0$), as calculated using equations supplied by R. A. Alvarez, "Some Properties of Microwave Resonant Cavities Relevant to Pulse-Compression Power Amplification," Lawrence Livermore National Laboratory, UCRL-94576 Preprint, April 1986. The length of the resonator should yield a switched pulse of 25 MW, 8 nanosecond duration. It is estimated that the maximum RMS E-field in the resonator will be 43 KV/cm on axis and 27 KV/cm at the cylinder wall.

Figure 4A:
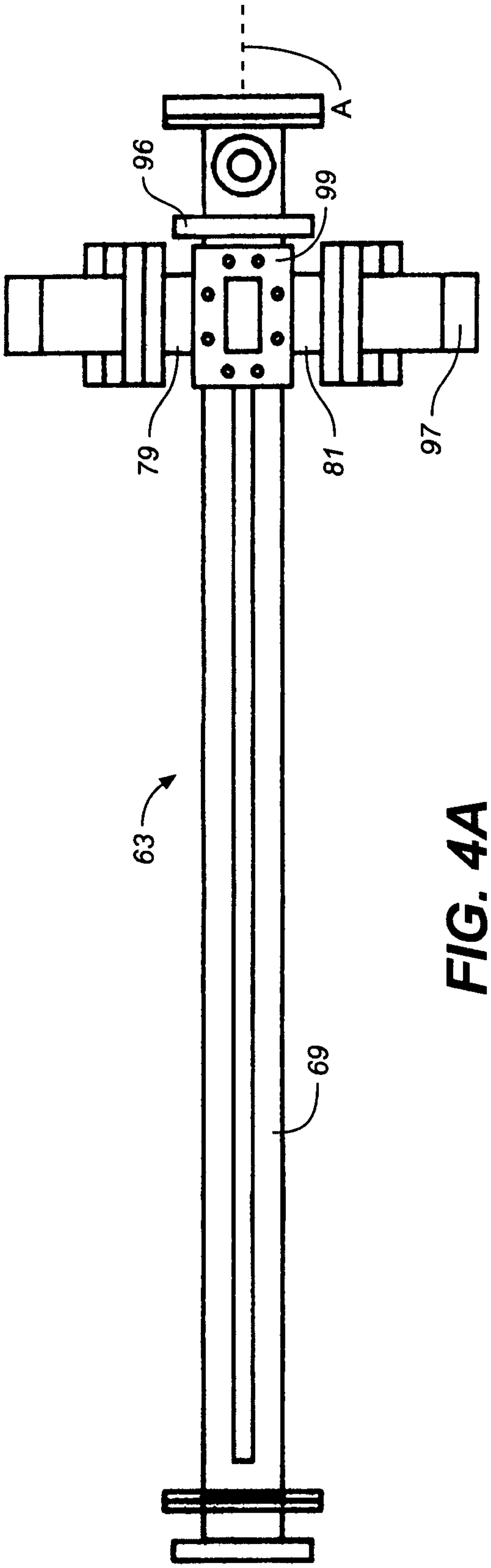
FIG. 4A is a top plane view of the cylindrical microwave pulse compressor shown in FIGS. 3A-3C, with a magic-T hybrid connected to the output waveguides of the compressor.
Figure 4B:
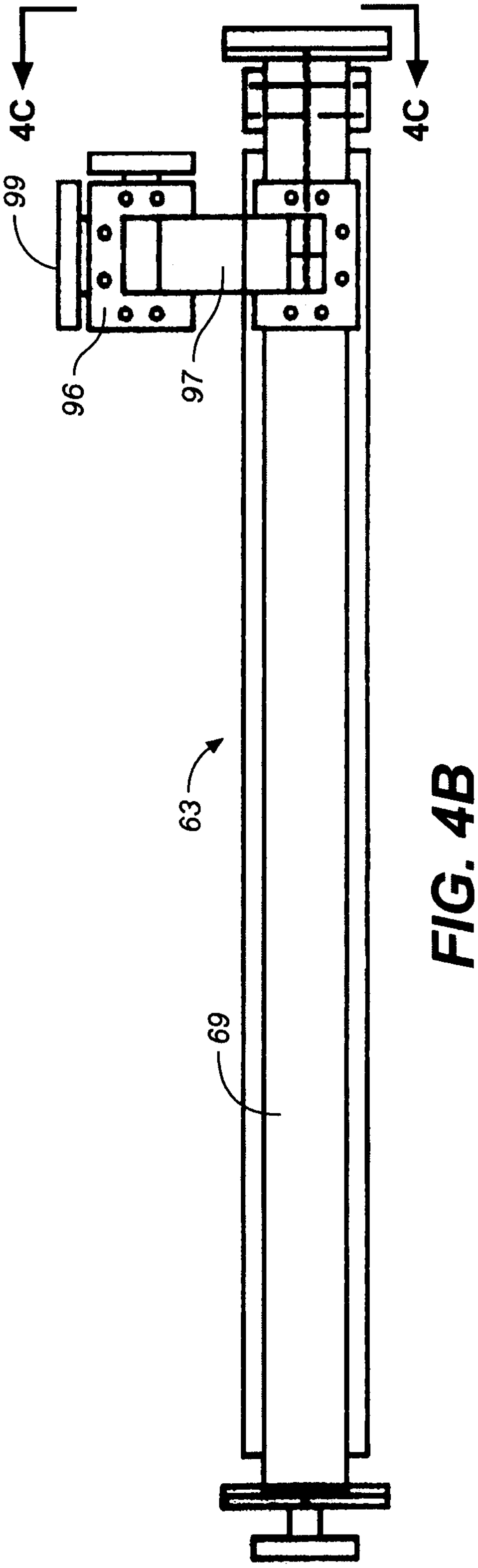
FIG. 4B is a side elevational view thereof.
Figure 4C:
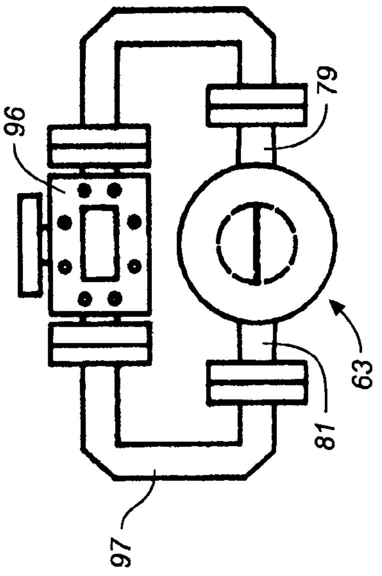
FIG. 4C is an end elevational view thereof.

FIGS. 4A and 4B show the cylindrical waveguide pulse compressor 61 seen in FIGS. 3A-3C, with its output waveguides 79, 81 connected to a magic-T hybrid 97, having an output port 96 and an isolated load arm port 99. A magic-T hybrid can be used to combine the compressors output guides and to correct for any unbalance in the output guides.

Figure 5A:
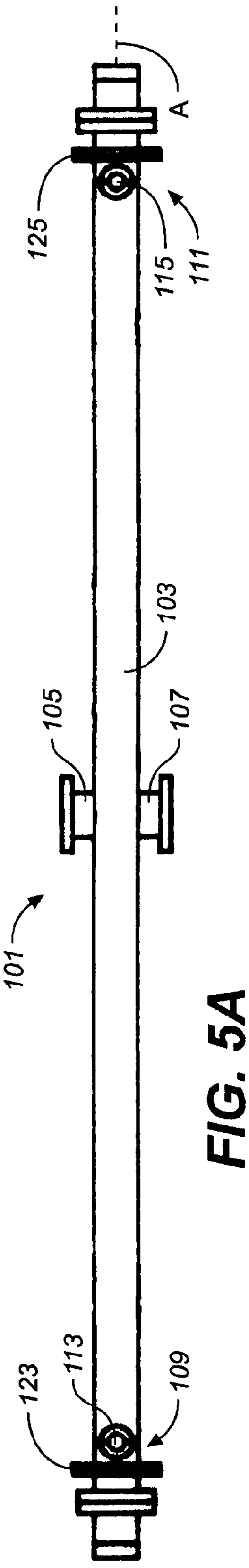
FIG. 5A is a top plane view of another embodiment of a microwave pulse compressor in accordance with the invention having dual inputs configured to reduce unwanted prepulses.
Figure 5B:
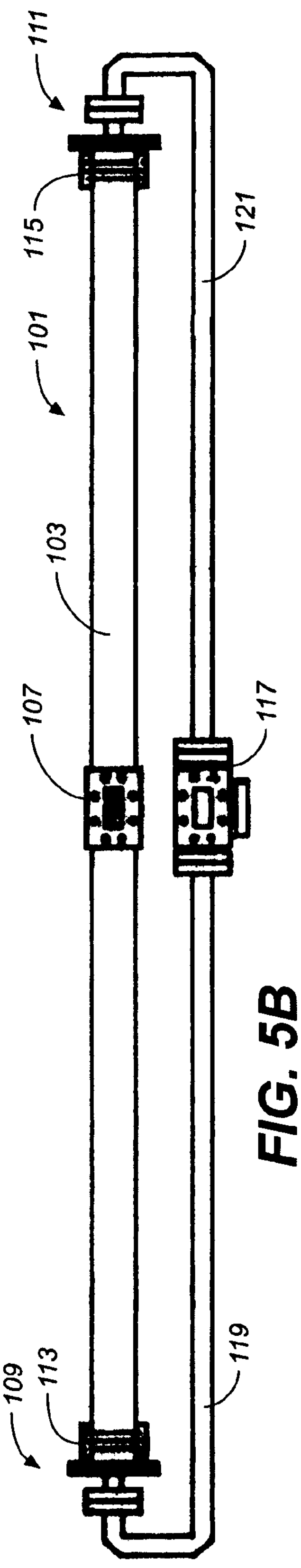
FIG. 5B is a side elevational view thereof showing a hybrid feed.

FIGS. 5A and 5B show a cylindrical pulse compressor 101 wherein the cylindrical resonator guide 103 is extended in length and wherein the resonator guide has two symmetrical output waveguides 105, 107 centered between resonator ends 109, 111. In this version of the pulse compressor, the resonator guide has dual inputs, one at each end, as well as two fast-acting switches 113, 115, typically plasma switches, associated with each guide end. Each input end also has a coupling aperture 123, 125 suitably designed to couple pulse power fed into each end of the guide to the fundamental mode only. Thus, in this balanced version of the pulse compressor, each end of the resonator guide acts as an input end and a switch-out end. (Only one is switched at a time. Either switch may be used exclusively, or the switches can be used in an alternating fashion.) As with the previously described embodiments of the invention, the resonator waveguide will have suitably placed dielectric waveguide windows at the inputs and outputs to maintain pressure in the resonator.

It is noted that, while, in this embodiment, the two switches contribute to the desired overall symmetry of the pulse compressor, it is contemplated that one of the switches could be eliminated, provided adjustments are made to length of the resonator waveguide.

A waveguide circuit for feeding each end of the balanced pulse compressor with equal amplitude and in-phase pulse power is suitably provided in the form of a magic-T hybrid 117 having its outputs connected to the resonator guide inputs at ends 109, 111 through equal length waveguide arms 119, 121. As with the previously described embodiments, the resonator guide 103 is an oversized guide capable of propagating higher order modes. The symmetry of the compressor will contribute to the suppression of these higher order modes. Other suppression techniques mentioned above can also be used.

This balanced version of the pulse has the advantage of minimizing pre-pulse phenomena associated with the previously described unbalanced resonator guides, where an unwanted pre-pulse of reduced amplitude can be coupled to the output guides before switch-out as pulse energy fills the resonator. This configuration has still another advantage: the increased length of the resonator guide results in a corresponding decrease in power density within the resonator.

Embodiments of the invention other than above-described are possible without departing from the spirit and scope of the invention. For example, a hybrid such as shown in FIG. 5B could be used to couple input pulse power directly to apertures placed at the top and bottom of an oversized cylindrical resonator at the mid-plane of the cylinder guide with the dual output guides, one on each side, at the same mid-plane through the cylinder. In this case the feed guides at the ends of the waveguide resonator which are shown in FIG. 5B would be removed. Again, the feed guides to each input aperture from the hybrid must be equal to assure equal amplitude and the proper phase. Also, an oversized waveguide resonator could have a slightly out-of-round shape (e.g. slightly oval or elliptical) to discriminate between two possible 90 degree $TE_{11}$ modes. It is still further contemplated that coax transmission lines could be used for the outputs from the resonator guide in place of the output waveguides.

The invention also contemplates that, at least for pulse compressors operating under modest gas pressure conditions in their waveguide resonators, the tubular dielectric plasma shorting switch shown in FIGS. 2A-5B can be replaced by a fast-acting plasma shorting switch formed by a thin dielectric, e.g. ceramic, disk or disks that act as waveguide windows that separate the plasma switch gas, which can be a helium or other inert gas mixture capable of holding off the E-field until a trigger is fired, from the gas (usually $SF_6$) that pressurizes the resonator. A trigger, such as a spark or laser trigger, applied to the switch gas in the isolated switching section created by the dielectric disk or disks would break down the switch gas to produce a conducting plasma in the switching section, which could be confined within the switching section by means of a magnetic lens. One such novel arrangement is illustrated in FIGS. 6A-6B.

Figure 6B:
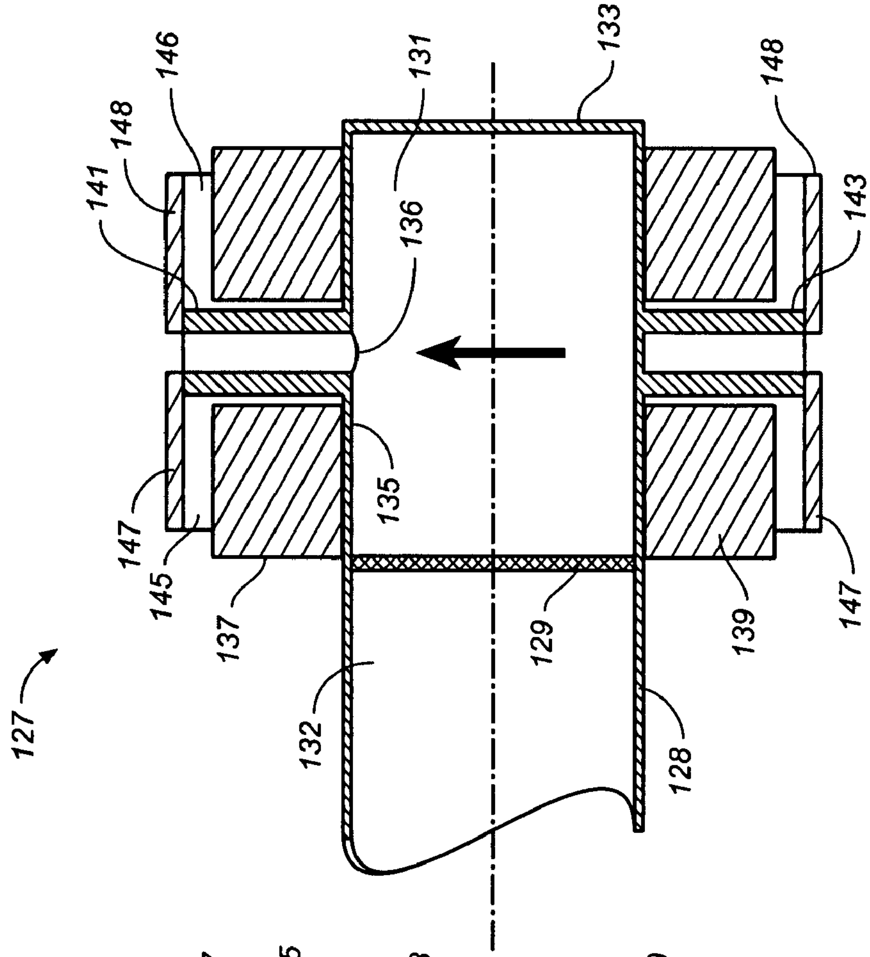
FIGS. 6A and 6B are graphical illustrations of an alternative embodiment of the invention wherein a novel form of a fast action plasma switch is used at the switch-out end of the waveguide resonator.
Figure 6A:
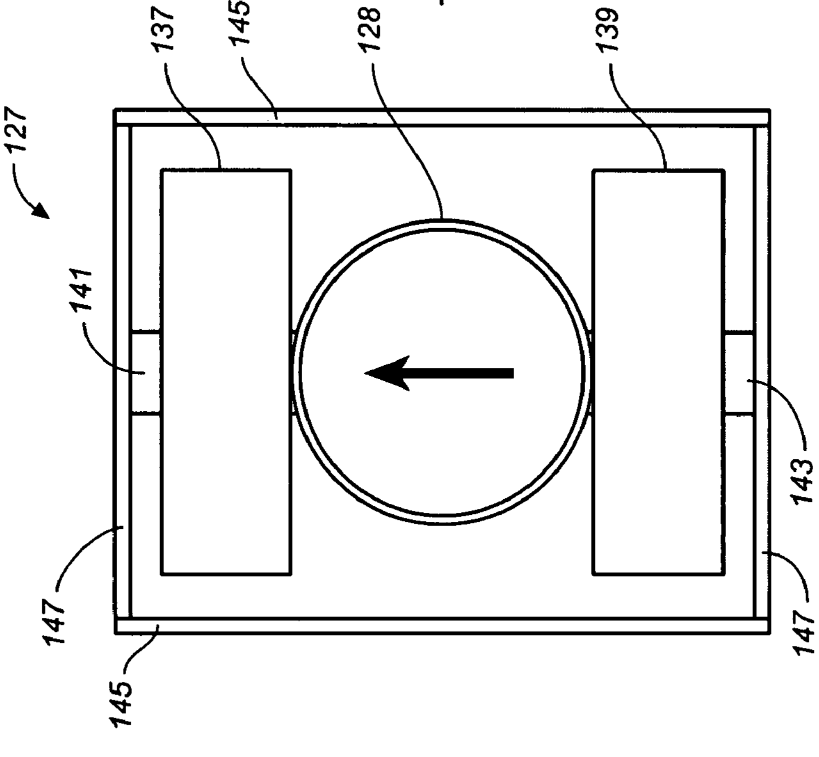

FIGS. 6A-6B show the switch-out end 127 of a cylindrical resonator guide 128 of a cylindrical pulse resonator such as illustrated in FIGS. 3A-3C, wherein a dielectric waveguide window 129 is near the switch-out end to create a low pressure switching section 131 of the waveguide that holds a volume of plasma switch gas at low pressure separately from the higher pressure gas used to pressurize the rest of the resonator guide (high pressure side 132). The ceramic window is located in the resonator guide between the resonator's output waveguides (not shown in FIGS. 6A and 6B) and its shorting end wall 133, and is preferably located at or substantially at a position of minimum electric field before switch-out to reduce dielectric losses during the fill time of the resonator. To further reduce fill time dielectric losses, the thickness of the dielectric used for the window is preferably no larger than necessary to withstand the differential gas pressure exerted on the window.

The switching section 131 has a plasma trigger in the section guide walls 135. The plasma trigger, which can suitably be a spark gap or laser trigger (not shown), is provided in a trigger port 136 in the section guide walls located at a position of maximum electric field before switch-out. Upon initiation of the trigger, the low pressure gas within the switching section will break down to form a conducting plasma that creates a short. This breakdown is caused by the large electric field strengths produced by the standing waves of the pre-switch-out microwave energy stored within the resonator guide.

To provide a switch with the greatest effectiveness, that is, a switch that most effectively creates a new shorting position in front of shorting end wall 133, the conducting plasma produced at switch-out is preferably confined to a narrow and more-or-less rod-shaped region in the center of the guide. Such confinement of the plasma is accomplished by providing magnetic confinement in the guide's low pressure switching section 131 at the position of the plasma trigger. Magnetic confinement is created by a transverse static magnetic field within the switching section 131 at the trigger location, which is parallel to the E-field which is present prior to switch-out. This static magnetic field is produced by reinforcing magnets 137, 139 provided on the outside of the guide's switching section 131. An effective magnetic field can suitably be produced by Helmholz coils or disk permanent magnets. A magnetic return circuit comprised of steel tubes 141, 143 and steel plates 145, 146, 147, and 148 is provided to maximize the magnetic field strength of the lens. The inside of steel tube 141 is suitably copper plated, and it is seen to provide an input for the spark or laser trigger of the plasma switch.

The low pressure plasma switching section 131 shown in FIGS. 6A and 6B has important advantages over conventional plasma switches that use dielectric tubes. First, with conventional dielectric tubes, the dielectric structure used to confine the trigger gas is located in a region of high electric field strengths. This produces relatively high dielectric losses which degrade the Q of the pulse compressor. It is also believed that the relatively large volume for the low pressure switch gas created behind a dielectric window will allow faster recombination of the switch gas, thereby decreasing the recovery time of the switch gas between pulses. This will allow the pulse compressor to produce higher repetition rates for the output pulses.

While the present application has been described in considerable detail in the foregoing specification and the accompanying drawings, it is not intended that the invention be limited to such detail, except as necessitated by the following claims.

I claim:

1. A microwave pulse compressor having an operating frequency comprising an elongated waveguide resonator having waveguide guide walls and opposed shorting end walls wherein the distance between said shorting end walls defines the length of the resonator, and wherein the length of said resonator is chosen based on the following criteria:

a. a length that produces the output pulse length desired, b. a length that produces a resonant condition for the fundamental mode at the operating frequency of the pulse compressor, and c. a length that does not produce a resonant condition for higher order modes at the operating frequency of the pulse compressor, said waveguide resonator being oversized in that the cross-sectional dimensions thereof are larger than required to propagate the fundamental mode only, an input for coupling microwave pulse power into said oversized waveguide resonator, at least one fast-action shorting switch positioned in front of at least one of the shorting end walls and defining a switch-out end of said waveguide resonator, wherein activation of said switch shifts the maximum electric and magnetic fields of the fundamental mode within the resonator waveguide, and two output transmission lines coupled to opposite guide walls of said oversized waveguide resonator so as to couple to a shifted field in the waveguide resonator and so as to provide symmetrical coupling of the pulse from the waveguide resonator when said fast-action switch is activated.

2. The microwave pulse compressor of claim 1 wherein said oversized waveguide resonator is comprised of a length of rectangular waveguide.

3. The microwave pulse compressor of claim 2 wherein said length of rectangular waveguide is square.

4. The microwave pulse compressor of claim 1 wherein said oversized waveguide resonator is comprised of a length of substantially circular waveguide.

5. The microwave pulse compressor of claim 4 wherein said oversized waveguide resonator has a slightly out-of-round shape to discriminate between two possible 90 degree $TE_{11}$ modes.

6. A microwave pulse compressor having an operating frequency comprising an elongated waveguide resonator having at least one input end, at least one switch-out end, and waveguide sidewalls, said input end and switch-out end each having a shorting end wall wherein the distance between said shorting walls defines the length of the waveguide resonator, means for coupling microwave pulse power into the waveguide resonator at the input end thereof, a fast-action shorting switch positioned at the switch-out end of the waveguide resonator in front of the shorting end wall such that activation of said switch shifts the maximum electric and magnetic fields of the fundamental mode within the waveguide resonator, and output waveguides symmetrically coupled to the sidewalls of said waveguide resonator so as to couple to the magnetic field of the waveguide's fundamental mode, and located along said sidewall so as to couple to a shifted field in the waveguide resonator when said fast-action switch is activated, and said waveguide resonator being oversized in that the cross-sectional dimensions thereof are larger than required to propagate the fundamental mode only, and having a length based on the following criteria:

a. a length that produces the output pulse length desired, b. a length that produces a resonant condition for the fundamental mode at the operating frequency of the pulse compressor, and c. a length that does not produce a resonant condition for higher order modes at the operating frequency of the pulse compressor.

7. The microwave pulse compressor of claim 6 wherein two output waveguides are coupled to opposite sidewalls of said oversized waveguide resonator.

8. The microwave pulse compressor of claim 6 wherein the means for coupling microwave pulse power into the oversized waveguide resonator includes an aperture in the shorting wall at the resonator's input end.

9. The microwave pulse compressor of claim 8 wherein said aperture is configured on the shorting end wall at the input end of said oversized waveguide resonator so as to couple input pulse power into the waveguide's fundamental mode without substantial coupling to higher order modes of the resonator.

10. The microwave pulse compressor of claim 6 wherein said oversized waveguide resonator is comprised of a length of rectangular waveguide.

11. The microwave pulse compressor of claim 10 wherein said rectangular waveguide is square.

12. The microwave pulse compressor of claim 6 wherein said oversized waveguide resonator is comprised of a length of substantially circular waveguide.

13. The microwave pulse compressor of claim 12 wherein said oversized waveguide resonator has a slightly out-of-round shape to discriminate between two possible 90 degree $TE_{11}$ modes.

14. The microwave pulse compressor of claim 6 wherein said fast-action shorting switch is a plasma switch.

15. The microwave pulse compressor of claim 14 wherein said plasma switch is comprised of a dielectric window in said waveguide resonator near the switch-out end thereof for creating an isolated switching section at the switch-out end of said waveguide resonator that holds a volume of plasma switch gas at low pressure, and a trigger in the waveguide sidewalls of said waveguide resonator at a location of maximum electric field before switch-out within the switching section of said waveguide resonator.

16. The microwave pulse compressor of claim 15 wherein said plasma switch further includes means for producing a static magnetic field for confining the plasma produced within said switching section upon actuation of said trigger to a defined region within said switching section.

17. The microwave pulse compressor of claim 15 wherein the dielectric window creating the isolated switching section at the switch-out end of said waveguide resonator is located at a position of minimum electric field before switch-out.

18. The microwave pulse compressor of claim 15 wherein the dielectric window creating the isolated switching section at the switch-out end of said waveguide resonator is located in the waveguide resonator between said at least one output waveguide and the shorting end wall at the switch-out end of said waveguide resonator.

19. A microwave pulse compressor having an operating frequency comprising an elongated waveguide resonator having waveguide guide walls and opposed shorting end walls wherein the distance between said shorting end walls defines the length of the resonator, said waveguide resonator being oversized in that the cross-sectional dimensions thereof are larger than required to propagate the fundamental mode only, and at least one input for coupling microwave pulse power into said oversized waveguide resonator, at least one fast action shorting switch positioned in front of at least one of the shorting end walls and defining a switch-out end of said resonator, wherein activation of said switch shifts the maximum electric and magnetic fields of the fundamental mode within the resonator waveguide, and output transmission lines attached to the guide walls of said oversized waveguide resonator so as to couple to a shifted field in the waveguide resonator when said fast-action switch is activated, said output transmission lines being symmetrically disposed about the about the waveguide resonator to provide symmetrical coupling of the pulse from the resonator upon activation of said shorting switch, and the length of said resonator waveguide being chosen based on the following criteria:

a. a length that produces the output pulse length desired, b. a length that produces a resonant condition for the fundamental mode at the operating frequency of the pulse compressor, and c. a length that does not produce a resonant condition for higher order modes at the operating frequency of the pulse compressor.

20. The microwave pulse compressor of claim 19 wherein two output transmission lines are provided, said output transmission lines being coupled in an opposed relationship to the guide walls of said oversized waveguide resonator.

21. The microwave pulse compressor of claim 19 wherein said input for coupling microwave pulse power into said oversized waveguide resonator includes an aperture in at least one of the shorting ends walls of waveguide resonator, said aperture being configured to couple input pulse power into the waveguide's fundamental mode without substantial coupling to higher order modes of the resonator.

22. The microwave pulse compressor of claim 19 wherein conductive bifurcation plates are provided in said waveguide resonator at the input and switch-out ends thereof, said bifurcation plates being configured to suppress higher order modes in said waveguide resonator.

23. A microwave pulse compressor having an operating frequency comprising an elongated waveguide resonator having waveguide guide walls and opposed shorting end walls wherein the distance between said shorting end walls defines the length of the resonator, said waveguide resonator being oversized in that the cross-sectional dimensions thereof are larger than required to propagate the fundamental mode only, and at least one input for coupling microwave pulse power into said oversized waveguide resonator, at least one fast-action shorting switch positioned in front of at least one of the shorting end walls and defining a switch-out end of said resonator, wherein activation of said switch shifts the maximum electric and magnetic fields of the fundamental mode within the resonator waveguide, output transmission lines symmetrically attached to the guide walls of said oversized waveguide resonator so as to couple to a shifted field in the waveguide resonator when said fast-action switch is activated, and means for suppressing higher order modes in said waveguide resonator at the pulse compressor's operating frequency.

24. The microwave pulse compressor of claim 23 wherein said plasma switch is comprised of a dielectric window in said waveguide resonator near the switch-out end thereof for creating an isolated switching section at the switch-out end of said waveguide resonator that holds a volume of plasma switch gas at low pressure, and a trigger in the waveguide sidewalls of said waveguide resonator at a location of maximum electric field before switch-out within the switching section of said waveguide resonator.

25. The microwave pulse compressor of claim 24 wherein said plasma switch further includes means for producing a static magnetic field for confining the plasma produced within said switching section upon actuation of said trigger to a defined region within said switching section.

26. The microwave pulse compressor of claim 25 wherein the dielectric window creating the isolated switching section at the switch-out end of said waveguide resonator is located at a position of minimum electric field before switch-out.

27. The microwave pulse compressor of claim 26 wherein the dielectric window creating the isolated switching section at the switch-out end of said waveguide resonator is located in the waveguide resonator between said at least one output waveguide and the shorting end wall at the switch-out end of said waveguide resonator.

* * * * *

UNITED STATES PATENT AND TRADEMARK OFFICE

CERTIFICATE OF CORRECTION

PATENT NO. : 7,551,042 B1
APPLICATION NO. : 11/810459
DATED : June 23, 2009
INVENTOR(S) : Ray M. Johnson It is certified that error appears in the above-identified patent and that said Letters Patent is hereby corrected as shown below:

Col. 1, line 23, --to-- should be inserted between "enough" and "exclude".
Col. 3, line 37, --pulse-- should be inserted between "known" and "microwave".
Col. 5, line 6, "trial-and error" should read --trial-and-error--.
Col. 5, line 51, --the-- should be inserted between "while" and "resonator".
Col. 5, line 56, "preferably be provided" should read --preferably provided--.
Col. 6, line 10, "can be use" should read --can be used--.
Col. 7, line 12, "compressors" should read --compressor's--.
Col. 7, line 35, "made to length" should read --made to the length--.
Col. 11, line 42, "about the about the waveguide" should read --about the waveguide--.

Signed and Sealed this

Fifth Day of January, 2010

David J. Kappos

David J. Kappos
*Director of the United States Patent and Trademark Office*